United States Patent
Lho et al.

(10) Patent No.: US 12,046,750 B2
(45) Date of Patent: Jul. 23, 2024

(54) POSITIVE ELECTRODE ACTIVE MATERIAL FOR SECONDARY BATTERY, PREPARATION METHOD THEREOF, AND POSITIVE ELECTRODE FOR SECONDARY BATTERY INCLUDING SAME

(71) Applicant: LG Energy Solution, Ltd., Seoul (KR)

(72) Inventors: Eun Sol Lho, Daejeon (KR); Wang Mo Jung, Daejeon (KR); Min Suk Kang, Daejeon (KR); Sang Wook Lee, Daejeon (KR); So Ra Baek, Daejeon (KR); Wen Xiu Wang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 415 days.

(21) Appl. No.: 17/294,923

(22) PCT Filed: Nov. 28, 2019

(86) PCT No.: PCT/KR2019/016579
§ 371 (c)(1),
(2) Date: May 18, 2021

(87) PCT Pub. No.: WO2020/116858
PCT Pub. Date: Jun. 11, 2020

(65) Prior Publication Data
US 2022/0020983 A1 Jan. 20, 2022

(30) Foreign Application Priority Data
Dec. 3, 2018 (KR) .......................... 10-2018-0153838

(51) Int. Cl.
*H01M 4/525* (2010.01)
*C01G 53/00* (2006.01)
*H01M 4/505* (2010.01)
*H01M 10/0525* (2010.01)
*H01M 4/02* (2006.01)

(52) U.S. Cl.
CPC ............ *H01M 4/525* (2013.01); *C01G 53/50* (2013.01); *H01M 4/505* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| 8,383,270 B2 | 2/2013 | Kikuchi et al. |
| 9,406,930 B2 | 8/2016 | Fukui et al. |
| 2011/0129734 A1 | 6/2011 | Konishi et al. |
| 2011/0240913 A1 | 10/2011 | Kim et al. |
| 2013/0344386 A1 | 12/2013 | Kim et al. |
| 2016/0028077 A1 | 1/2016 | Kwak et al. |
| 2016/0172671 A1 | 6/2016 | Yoo et al. |
| 2017/0294651 A1 | 10/2017 | Choi et al. |
| 2018/0212237 A1 | 7/2018 | Lee et al. |
| 2018/0241036 A1 | 8/2018 | Jo et al. |
| 2018/0316005 A1 | 11/2018 | Shin et al. |
| 2019/0288285 A1 | 9/2019 | Kim et al. |
| 2020/0161651 A1 | 5/2020 | Sun et al. |
| 2020/0335781 A1* | 10/2020 | Oshita ............. H01M 4/525 |
| 2021/0151754 A1 | 5/2021 | Baek et al. |

FOREIGN PATENT DOCUMENTS

| CN | 102082269 A | 6/2011 |
| CN | 103715424 A | 4/2014 |
| CN | 107949938 A | 4/2018 |
| CN | 111492511 A | 8/2020 |
| EP | 2372819 A2 | 10/2011 |
| JP | 2018085221 A | 5/2018 |
| KR | 20050044771 A | 5/2005 |
| KR | 20150050509 A | 5/2015 |
| KR | 20160053849 A | 5/2016 |
| KR | 20160073178 A | 6/2016 |
| KR | 20160081545 A | 7/2016 |
| KR | 101689213 B1 | 12/2016 |
| KR | 20170009557 A | 1/2017 |
| KR | 20170063373 A | 6/2017 |
| KR | 101882878 B1 | 7/2018 |
| KR | 20180077090 A | 7/2018 |
| KR | 20180099542 A | 9/2018 |
| KR | 20180110249 A | 10/2018 |
| KR | 20180115644 A | 10/2018 |
| WO | 2017095081 A1 | 6/2017 |

OTHER PUBLICATIONS

Search Report for European Application No. 19894008.2 dated Dec. 15, 2021. 2 pgs.
International Search Report for Application No. PCT/KR2019/016579, dated Mar. 10, 2020, 2 pages.

* cited by examiner

*Primary Examiner* — Carlos Barcena
(74) *Attorney, Agent, or Firm* — Lerner David LLP

(57) ABSTRACT

The present disclosure relates to a positive electrode active material for a secondary battery, the positive electrode active material being a lithium composite transition metal oxide particle including nickel (Ni) and cobalt (Co) and including at least one of manganese (Mn) and aluminum (Al), wherein the lithium composite transition metal oxide particle includes 60 mol % or greater of the nickel (Ni) in all metals excluding lithium, a doping element is doped on the lithium composite transition metal oxide particle, and the particle intensity of the lithium composite transition metal oxide particle is 210 MPa to 290 MPa.

13 Claims, 7 Drawing Sheets

POSITIVE ELECTRODE ACTIVE MATERIAL FOR SECONDARY BATTERY, PREPARATION METHOD THEREOF, AND POSITIVE ELECTRODE FOR SECONDARY BATTERY INCLUDING SAME

CROSS-REFERENCE TO RELATED APPLICATIONS

The present application is a national phase entry under 35 U.S.C. § 371 of International Application No. PCT/KR2019/016579 filed Nov. 28, 2019, which claims priority to Korean Patent Application No. 10-2018-0153838, filed on Dec. 3, 2018, all of which are incorporated by reference herein in their entirety.

TECHNICAL FIELD

The present disclosure relates to a positive electrode active material for a secondary battery, a preparation method thereof, and a positive electrode for a secondary battery and a lithium secondary battery both including the same.

BACKGROUND ART

Recently, the demand for a small and lightweight secondary battery having a relatively high capacity is rapidly increased due to the rapid spread of electronic devices using batteries, such as cell phones, notebook computers, electric vehicles, and the like. Particularly, a lithium secondary battery is lightweight and has a high energy density, and thus, is attracting attention as a driving power source for portable devices. Therefore, research and development efforts for improving the performance of a lithium secondary battery have been actively conducted.

A lithium secondary battery generates electric energy by an oxidation and reduction reaction when lithium ions are intercalated/de-intercalated from a positive electrode and a negative electrode when an organic electrolyte or a polymer electrolyte is charged between the positive electrode and the negative electrode made of active materials capable of intercalation and de-intercalation of lithium ions.

As a positive electrode active material of a lithium secondary battery, a lithium cobalt oxide ($LiCoO_2$) has been mainly used. In addition, the use of $LiMnO_2$ having a layered crystal structure, a lithium manganese oxide such as $LiMn_2O_4$ having a spinel-like crystal structure, and a lithium nickel oxide ($LiNiO_2$) is also being considered.

Recently, the use of a lithium composite transition metal oxide in a form in which a part of nickel is substituted with another transition metal such as manganese and cobalt has been proposed. In particular, a lithium composite transition metal oxide containing nickel in a high content has an advantage of being relatively excellent in capacity properties.

However, in the case of the positive electrode active material described above, cracks may be generated on a particle due to a roll-pressing process performed in the manufacturing of an electrode, or structural collapse may occur due to repeated intercalation/de-intercalation of lithium. Since the particle cracks, structural collapse, and the like of the positive electrode active material cause deterioration in cell performance, the resolution of these problems is urgently required.

Korean Patent Laid-Open Publication No. 10-2016-0053849 discloses a positive electrode active material and a secondary battery including the same.

DETAILED DESCRIPTION OF THE PRESENT DISCLOSURE

Technical Problem

An aspect of the present disclosure provides a positive electrode active material for a secondary battery, the positive electrode active material capable of preventing particle cracks in the positive electrode active material and improving the structural stability thereof.

Another aspect of the present disclosure provides a positive electrode active material for a secondary battery, the positive electrode active material having significantly improved lifespan properties at high temperatures.

Yet another aspect of the present disclosure provides a method for preparing the above-described positive electrode active material for a secondary battery.

Yet another aspect of the present disclosure provides a positive electrode for a secondary battery and a lithium secondary battery both including the above-described positive electrode active material for a secondary battery.

Technical Solution

According to an aspect of the present disclosure, there is provided a positive electrode active material for a secondary battery, the positive electrode active material being a lithium composite transition metal oxide particle including nickel (Ni) and cobalt (Co) and including at least one of manganese (Mn) and aluminum (Al), wherein the lithium composite transition metal oxide particle includes 60 mol % or greater of the nickel (Ni) in all metals excluding lithium, a doping element is doped on the lithium composite transition metal oxide particle, and the particle intensity of the lithium composite transition metal oxide particle is 210 MPa to 290 MPa.

According to another aspect of the present disclosure, there is provided a method for preparing the above-described positive electrode active material for a secondary battery, the method including mixing a transition metal hydroxide which includes nickel (Ni) and cobalt (Co) and includes at least one of manganese (Mn) and aluminum (Al), wherein the nickel (Ni) is 60 mol % or greater in all metals, with a lithium compound and subjecting the mixture to primary firing to prepare a lithium composite transition metal oxide particle, and mixing the lithium composite transition metal oxide particle and a doping source including a doping element and subjecting the mixture to secondary firing to dope the doping element on the lithium composite transition metal oxide particle.

According to yet another aspect of the present disclosure, there is provided a positive electrode for a secondary battery, the positive electrode including a positive electrode current collector and a positive electrode active material layer formed on the positive electrode current collector, wherein the positive electrode active material layer includes the above-described positive electrode active material for a secondary battery.

According to yet another aspect of the present disclosure, there is provided a lithium secondary battery including the above-described positive electrode for a secondary battery, a negative electrode facing the positive electrode for a secondary battery, a separator interposed between the positive electrode for a secondary battery and the negative electrode, and an electrolyte.

Advantageous Effects

A positive electrode active material for a secondary battery of the present disclosure is doped with a doping element and has a specific particle strength range. Accordingly, the positive electrode active material may have significantly improved structural stability of a particle and the problem of cracks in the particle may be prevented.

In addition, since the positive electrode active material for a secondary battery of the present disclosure is excellent in structural stability and has particle strength adjusted to be in a specific range, a positive electrode for a secondary battery and a lithium secondary battery both including the above-described positive electrode active material for a secondary battery may have significantly improved lifespan properties at high temperatures.

MODES FOR CARRYING OUT THE PRESENT DISCLOSURE

Figure 1:
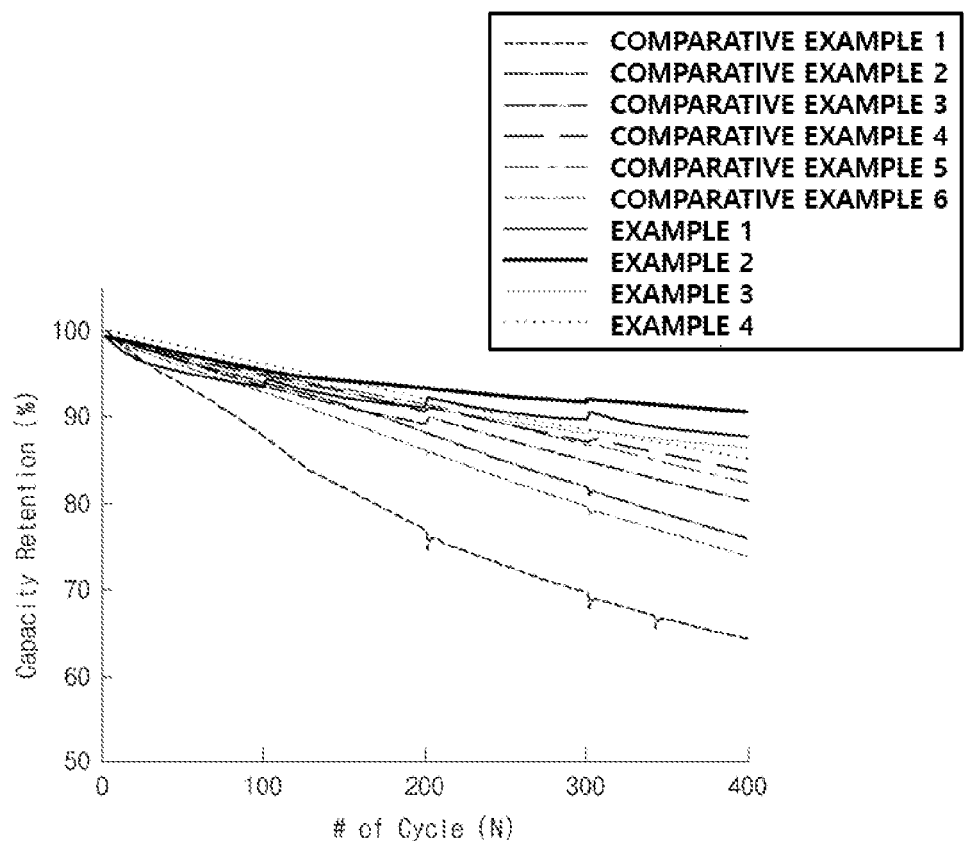
FIG. 1 is a graph showing the capacity retention rate, which is a ratio of a discharge capacity according to each charge/discharge cycle to an initial discharge capacity, of lithium secondary batteries respectively including the positive electrode active material for a secondary battery of each of Examples 1 to 4 and Comparative Examples 1 to 6.
Figure 2:
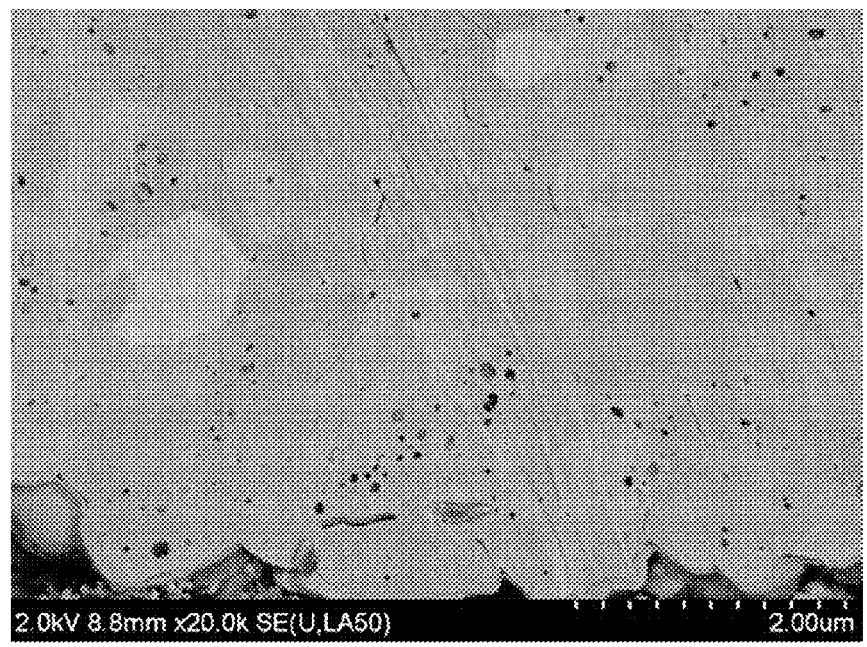
FIG. 2 is a scanning electron microscope (SEM) photograph of a lithium secondary battery including the positive electrode active material for a secondary battery of Example 1 to identify the breakage of a positive electrode active material particle after performing charge/discharge 400 times at a high temperature (45° C.)
Figure 3:
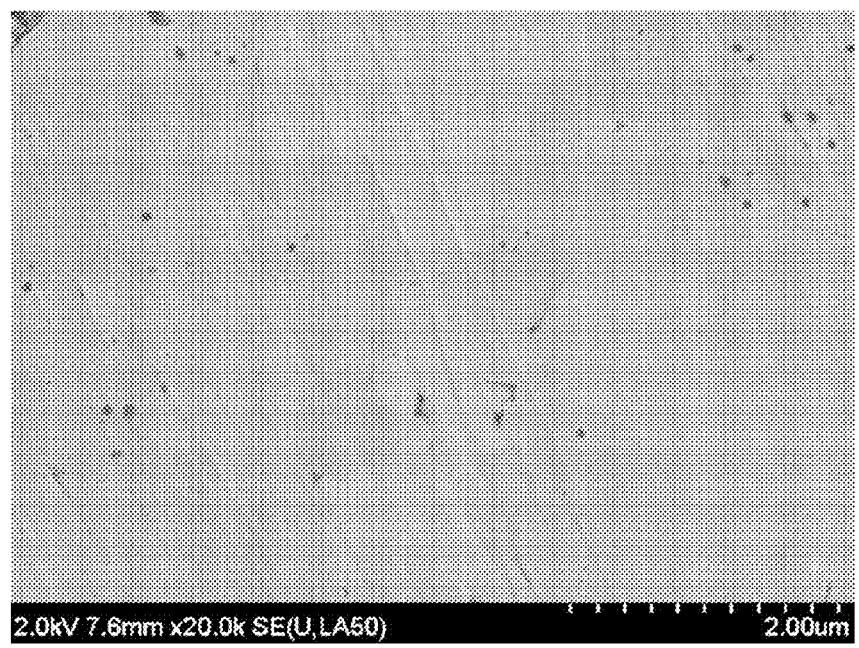
FIG. 3 is a scanning electron microscope (SEM) photograph of a lithium secondary battery including the positive electrode active material for a secondary battery of Example 2 to identify the breakage of a positive electrode active material particle after performing charge/discharge 400 times at a high temperature (45° C.)
Figure 4:
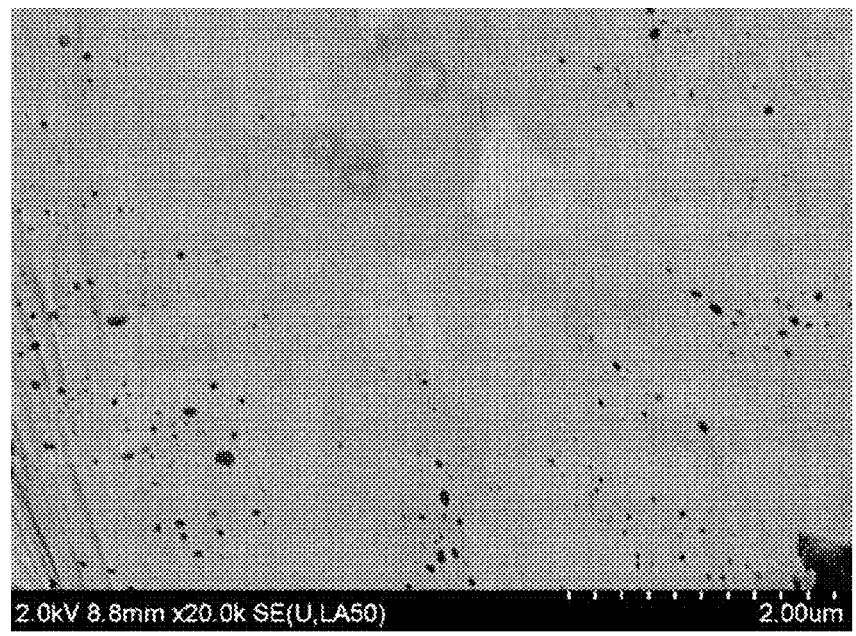
FIG. 4 is a scanning electron microscope (SEM) photograph of a lithium secondary battery including the positive electrode active material for a secondary battery of Example 3 to identify the breakage of a positive electrode active material particle after performing charge/discharge 400 times at a high temperature (45° C.)
Figure 5:
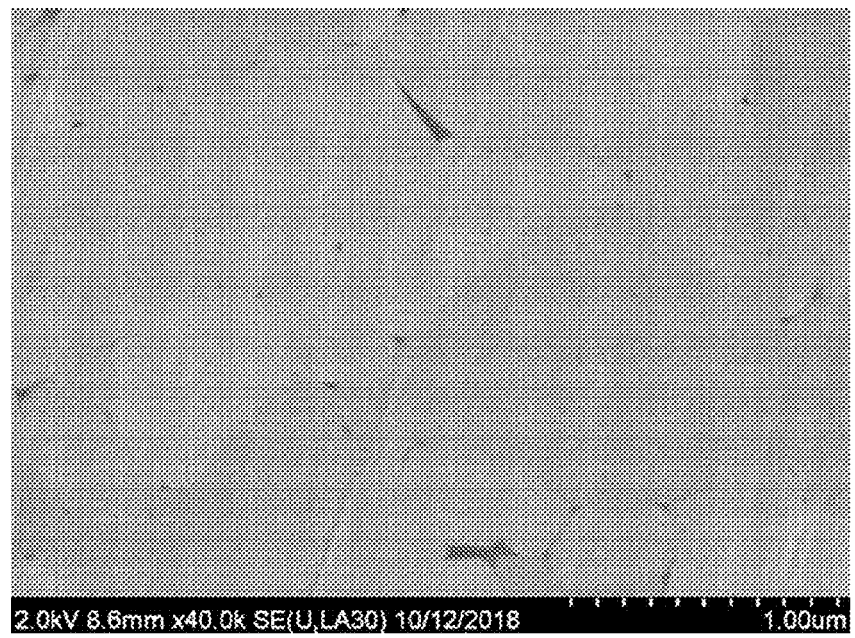
FIG. 5 is a scanning electron microscope (SEM) photograph of a lithium secondary battery including the positive electrode active material for a secondary battery of Example 4 to identify the breakage of a positive electrode active material particle after performing charge/discharge 400 times at a high temperature (45° C.)
Figure 6:
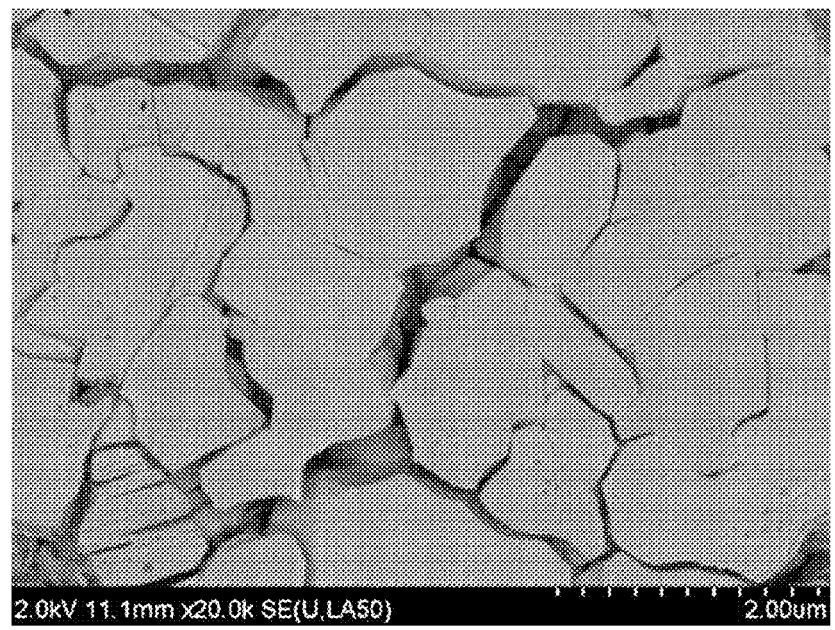
FIG. 6 is a scanning electron microscope (SEM) photograph of a lithium secondary battery including the positive electrode active material for a secondary battery of Comparative Example 1 to identify the breakage of a positive electrode active material particle after performing charge/discharge 400 times at a high temperature (45° C.)
Figure 7:
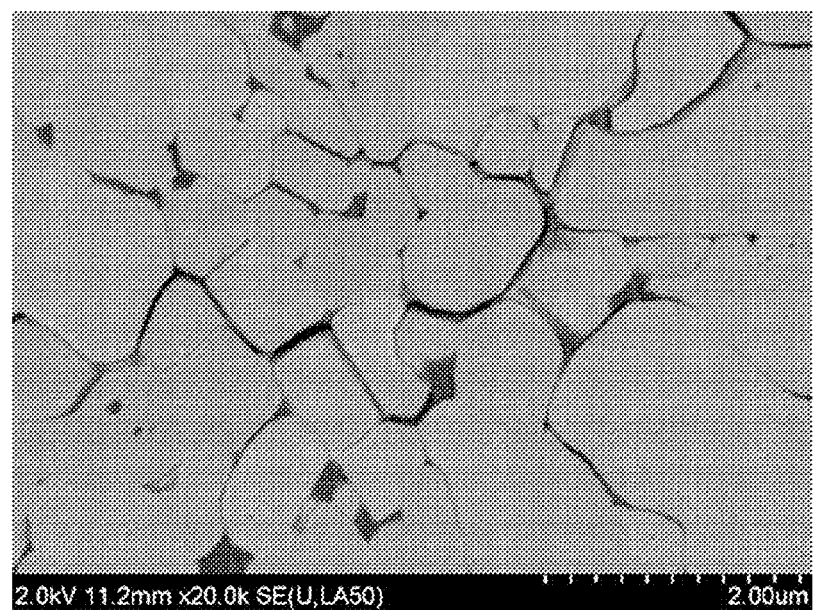
FIG. 7 is a scanning electron microscope (SEM) photograph of a lithium secondary battery including the positive electrode active material for a secondary battery of Comparative Example 2 to identify the breakage of a positive electrode active material particle after performing charge/discharge 400 times at a high temperature (45° C.)
Figure 8:
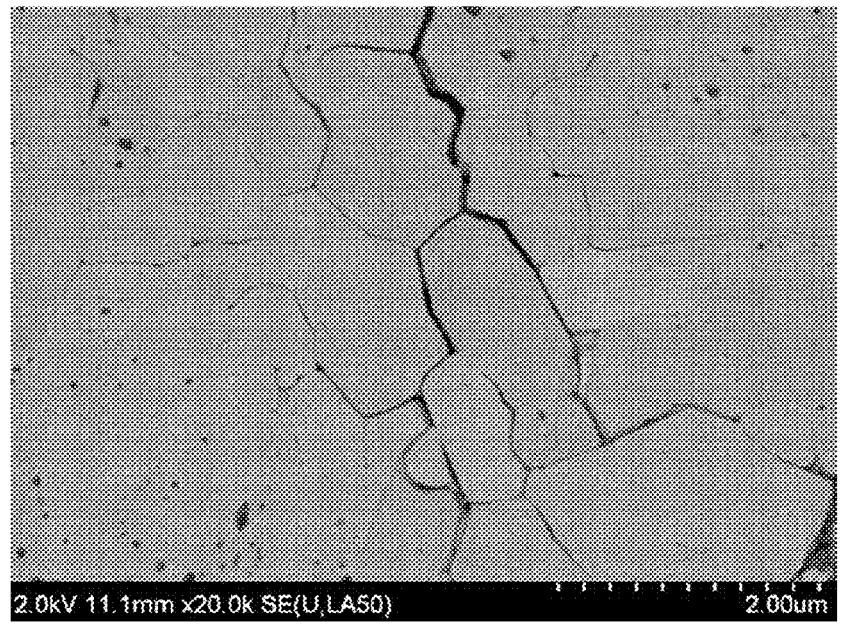
FIG. 8 is a scanning electron microscope (SEM) photograph of a lithium secondary battery including the positive electrode active material for a secondary battery of Comparative Example 3 to identify the breakage of a positive electrode active material particle after performing charge/discharge 400 times at a high temperature (45° C.)
Figure 9:
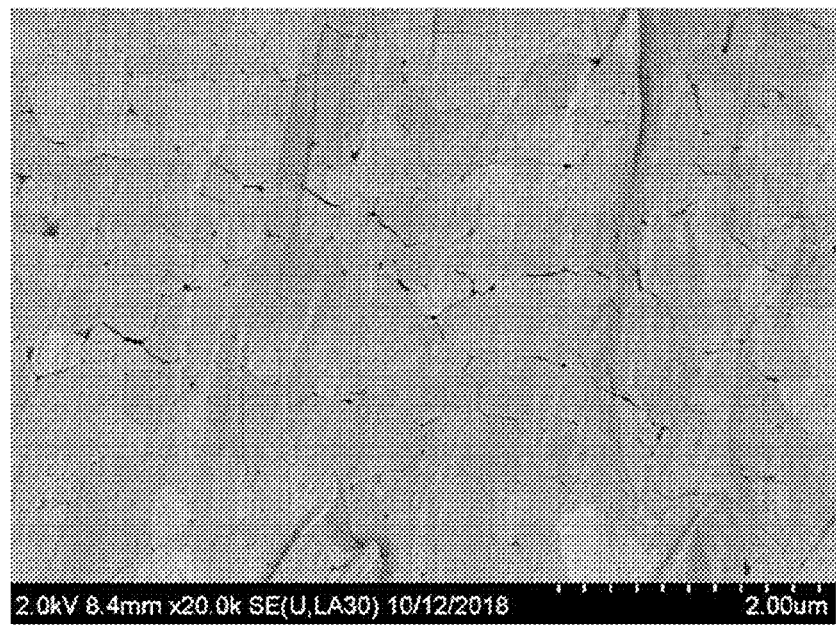
FIG. 9 is a scanning electron microscope (SEM) photograph of a lithium secondary battery including the positive electrode active material for a secondary battery of Comparative Example 4 to identify the breakage of a positive electrode active material particle after performing charge/discharge 400 times at a high temperature (45° C.)
Figure 10:
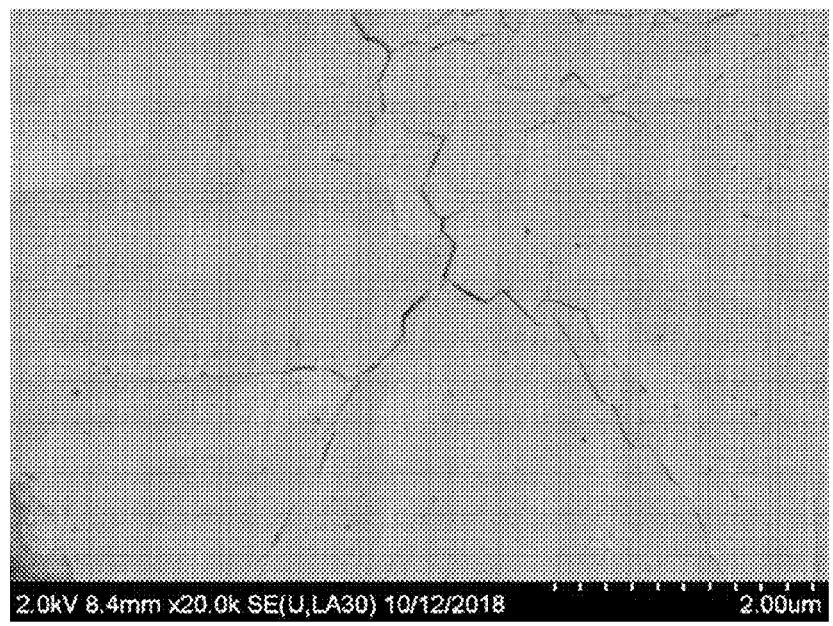
FIG. 10 is a scanning electron microscope (SEM) photograph of a lithium secondary battery including the positive electrode active material for a secondary battery of Comparative Example 5 to identify the breakage of a positive electrode active material particle after performing charge/discharge 400 times at a high temperature (45° C.)
Figure 11:
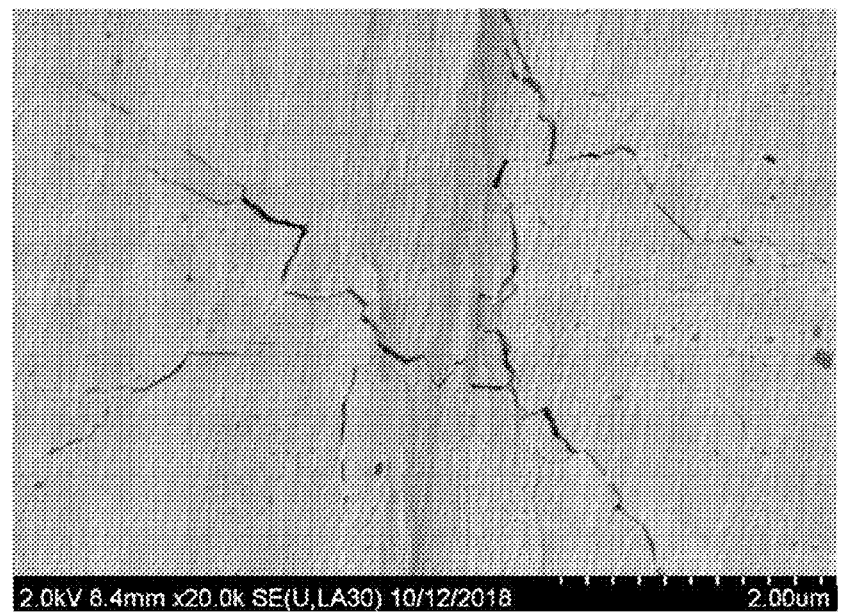
FIG. 11 is a scanning electron microscope (SEM) photograph of a lithium secondary battery including the positive electrode active material for a secondary battery of Comparative Example 6 to identify the breakage of a positive electrode active material particle after performing charge/discharge 400 times at a high temperature (45° C.)

It will be understood that words or terms used in the specification and claims of the present disclosure shall not be construed as being limited to having the meaning defined in commonly used dictionaries. It will be further understood that the words or terms should be interpreted as having meanings that are consistent with their meanings in the context of the relevant art and the technical idea of the present disclosure, based on the principle that an inventor may properly define the meaning of the words or terms to best explain the present disclosure.

The terminology used herein is for the purpose of describing particular exemplary embodiments only and is not intended to be limiting of the present disclosure. The terms of a singular form may include plural forms unless the context clearly indicates otherwise.

In the present specification, it should be understood that the terms "include," "comprise," or "have" are intended to specify the presence of stated features, numbers, steps, elements, or combinations thereof, but do not preclude the presence or addition of one or more other features, numbers, steps, elements, or combinations thereof.

In the present specification, an average particle diameter ($D_{50}$) may be defined as a particle diameter corresponding to 50% of the volume accumulation in a particle diameter distribution curve of a particle. The average particle diameter ($D_{50}$) may be measured by, for example, a laser diffraction method. The laser diffraction method generally enables measurement of a particle diameter from a sub-micron region to several millimeters, so that results of high reproducibility and high resolution may be obtained.

Hereinafter, the present disclosure will be described in more detail.

<Positive Electrode Active Material for Secondary Battery>

The present disclosure relates to a positive electrode active material for a secondary battery, and specifically, to a positive electrode active material for a lithium secondary battery.

The positive electrode active material for a secondary battery of the present disclosure is a lithium composite transition metal oxide particle including nickel (Ni) and cobalt (Co) and including at least one of manganese (Mn) and aluminum (Al), wherein the lithium composite transition metal oxide particle includes 60 mol % or greater of the nickel (Ni) in all metals excluding lithium, a doping element is doped on the lithium composite transition metal oxide particle, and the particle strength of the lithium composite transition metal oxide particle is 210 MPa to 290 MPa.

The positive electrode active material for a secondary battery has a lithium composite transition metal oxide particle containing a high content of nickel and doped with a doping element, and has a specific particle strength range. Accordingly, the positive active material for the secondary battery has a high level of particle strength, and may have high structural stability. Accordingly, the positive electrode active material for a secondary battery may significantly prevent cracks or particle breakage during the roll-pressing of an electrode. In addition, the positive electrode active material for a secondary battery has improved particle intensity and structural stability, and thus, may have significantly improved lifespan properties at high temperatures.

The particle strength of the positive electrode active material for a secondary battery is 210 MPa to 290 MPa. The positive electrode active material for a secondary battery has the above-described particle strength range, and thus, may effectively prevent a particle breakage phenomenon during roll-pressing, prevent the structural collapse of a particle due to the intercalation/de-intercalation of lithium according to the charge/discharge of a battery, and impart excellent durability to the particle.

When the particle strength of the positive electrode active material for a secondary battery is less than 210 MPa, it is difficult to implement effects of preventing the particle breakage and improving the durability of a particle described above. When greater than 290 MPa, there is a risk of inhibiting the output of a battery, and it may be difficult to roll-press the particle since the intensity of the particle becomes excessively high. In severe cases, an electrode may be damaged, which is undesirable in terms of lifespan properties.

The particle strength of the positive electrode active material for a secondary battery may be preferably 215 MPa to 275 MPa, more preferably 223 MPa to 250 MPa, even more preferably 232 MPa to 245 MPa, in terms of further improving the durability, structural stability, and lifespan properties of the particle.

The above-described particle strength may be measured by dropping a positive electrode active material particle onto a plate through a micro compression testing machine, and then gradually applying pressure through the testing machine to a point at which the particle breaks, followed by quantifying the force of the point.

The particle strength range of the positive electrode active material for a secondary battery may be implemented by the type of a doping element, the control of the content of a doping element, the control of the degree of distribution of a doping element in a particle, and the control of the average particle diameter ($D_{50}$) of a positive electrode active material.

The positive electrode active material for a secondary battery is a lithium composite transition metal oxide particle including nickel (Ni) and cobalt (Co) and including at least one of manganese (Mn) and aluminum (Al).

The lithium composite transition metal oxide particles includes nickel (Ni) and cobalt (Co) and includes at least one of manganese (Mn) and aluminum (Al).

The lithium composite transition metal oxide particle may be a high-Ni lithium composite transition metal oxide particle containing 60 mol % or greater of the nickel (Ni) in all metals excluding lithium. Preferably, the lithium composite transition metal oxide particle may contain 61 mol % or greater of the nickel (Ni) in all metals excluding lithium. As in the present disclosure, when a high-Ni lithium composite transition metal oxide particle having the content of nickel (Ni) of the above-described range in all metals is used, it is possible to secure an even higher capacity.

The lithium composite transition metal oxide particle may be a lithium composite transition metal oxide having a ratio (Li/Me) of the number moles of lithium (Li) to the number of moles of all metals excluding lithium of 1 or greater, and thus, may improve the capacity properties and output properties of a battery.

Specifically, the lithium composite transition metal oxide may have a ratio (Li/Me) of the number moles of lithium (Li) to the number of moles of all metals excluding lithium of 1 to 1.3, specifically 1.01 to 1.25, more specifically 1.02 to 1.2. When the (Li/Me) is in the above-described range, it is good in terms of exhibiting excellent capacity and output properties of a battery.

The lithium composite transition metal oxide particle may be doped with a doping element. The doping element may be doped inside the lithium composite transition metal oxide particle.

The doping element may be doped on the lithium composite transition metal oxide particle to improve the structural stability and particle strength of a lithium composite transition metal oxide, particularly, a lithium composite transition metal oxide particle containing nickel in a high content.

The doping element may be doped to 6 mol % to 10 mol %, preferably 6.5 mol % to 9.8 mol %, more preferably 7.5 mol % to 9.5 mol % with respect to all metals excluding lithium in the lithium composite transition metal oxide particle. When the above range is satisfied, effects of preventing particle cracks during roll-pressing due to the improvement in particle strength, preventing structural collapse due to the improvement in structural stability, and improving lifespan performance at room temperature and high temperatures may be more preferably implemented.

The doping element may include at least one doping element selected from the group consisting of P, B, Al, Si, W, Zr, and Ti, preferably at least one doping element selected from the group consisting of B, W, Zr, and Ti, more preferably at least one doping element selected from the group consisting of W and Zr, and even more preferably a doping element of W. The doping element is a component capable of implementing a more desirable effect in terms of improving particle strength and structural stability, and may extend a moving channel of lithium to an appropriate level, which is preferable in terms of resistance reduction and output properties.

The doping element may be doped such that the content of the doping element decreases from the surface of the lithium composite transition metal oxide particle toward the center thereof. That is, a doping element may be contained in a higher content from a center portion of a particle toward a surface portion thereof, and accordingly, the improvement in particle strength and structural stability may be more preferably implemented. The doping element distribution in a particle of such a trend may be implemented by, for example, a method in which a primary fired material is first prepared by subjecting a transition metal hydroxide and a lithium compound to primary firing, and then the primary fired material and a doping source are subjected to secondary firing to further dope a doping element on a surface portion, instead of a method in which a transition metal hydroxide, a lithium compound, and a doping source are fired all at one when preparing a positive electrode active material.

The doping element may be doped to 70 mol % or greater, preferably 85 mol % or greater of the total number of moles of doping elements in a region corresponding to a distance of 60% to 100% from the center of the particle with respect to the half diameter of the lithium composite transition metal oxide particle. When the above range is satisfied, the doping element is more doped in a region closer to the surface of the particle than to the center thereof, so that the above-described effects of improving particle strength and preventing structural collapse may be more preferably implemented.

The above-described doping content distribution trend of the doping element may be evaluated indirectly by Energy Dispersive Spectrometer (EDS) analysis of a particle cross-section of a positive electrode active material. Specifically, the degree of doping of a doping element may be predicted through EDS analysis for each region from the center of a positive electrode active material particle to the surface thereof.

Also, the lithium composite transition metal oxide particle may have a value of 0.7 to 1, the value obtained by substituting the concentration of the doping element at the surface of the particle and the concentration of the doping element at the center of the particle analyzed by an Energy Dispersive Spectrometer (EDS) into Equation 1 below.

$$(H_s - H_c)/H_s \quad \text{[Equation 1]}$$

In Equation 1, $H_s$ is the concentration of the doping element at the surface of the particle when the lithium composite transition metal oxide particle is analyzed by an EDS, and $H_c$ is the concentration of the doping element at the center of the particle when the lithium composite transition metal oxide particle is analyzed by an EDS.

When the value obtained by Equation 1 above satisfies 0.7 to 1, the doping element may be more concentrated on the surface portion of the positive electrode active material, so that particle strength is further improved, and accordingly, durability and lifespan properties may be improved to a more excellent level.

Preferably, the lithium composite transition metal oxide particle may have a value of 0.9 to 1, the value obtained by substituting the concentration of the doping element at the surface of the particle and the concentration of the doping element at the center of the particle analyzed by EDS analysis into Equation 1, and when the above range is satisfied, the above-described effects may be more preferably implemented.

The lithium composite transition oxide particle may include a compound represented by Formula 1 below.

$$Li_pNi_{1-x-y-z}Co_xM^a_yM^b_zO_2 \quad \text{[Formula 1]}$$

In Formula 1, $1.0 \leq p \leq 1.5$, $0 < x \leq 0.2$, $0 < y \leq 0.2$, $0.06 \leq z \leq 0.1$, and $0 < x+y+z \leq 0.4$, $M^a$ is at least one selected from the group consisting of Mn and Al, and $M^b$ is at least one selected from the group consisting of P, B, Al, Si, W, Zr, and Ti.

In the compound represented by Formula 1 above, Li may be in a content corresponding to p, wherein $1 \leq p \leq 1.5$, specifically $1.01 \leq p \leq 1.25$, more specifically $1.02 \leq p \leq 1.2$. When the above range is satisfied, the output and capacity properties of a battery may be significantly improved.

In the compound represented by Formula 1 above, Ni may be included in a content corresponding to 1−(x+y+z), for example, $0.6 \leq 1-(x+y+z) < 1$, specifically $0.61 \leq 1-(x+y+z) < 1$, and accordingly, it is possible to secure a high capacity of a battery.

In the lithium composite transition metal oxide of Formula 1 above, Co may be included in a content corresponding to x, that is, $0 < x \leq 0.2$. When the x of Formula 1 is greater than 0.2, costs may increase.

In the compound represented by Formula 1 above, $M^a$ is a component capable of improving the stability of an active material, thereby improving the stability of a battery, and may be at least one selected from the group consisting of Mn and Al. When considering the effect of improving lifespan properties, $M^a$ may be included in a content corresponding to y, that is, $0 < y \leq 0.2$. When the y of Formula 1 above is greater than 0.2, the output properties and capacity properties of a battery may be rather deteriorated.

In the compound represented by Formula 1 above, $M^b$ is a doping element, and may be at least one selected from the group consisting of P, B, Al, Si, W, Zr, and Ti. $M^b$ may be included in a content corresponding to z, that is, $0.06 \leq z \leq 0.1$, preferably $0.065 \leq z \leq 0.098$, more preferably $0.075 \leq z \leq 0.095$.

The average particle diameter ($D_{50}$) of the positive electrode active material for a secondary battery may be 8 μm to 30 μm, preferably 10 μm to 20 μm. When the above range is satisfied, roll-pressing may be smoothly performed, structural stability may be improved, and the above-described effect of improving output properties and lifespan properties may be implemented to an excellent level.

<Method for Preparing Positive Electrode Active Material for Secondary Battery>

Also, the present disclosure provides a method for preparing the above-described positive electrode active material for a secondary battery.

The method for preparing a positive electrode active material for a secondary battery includes mixing a transition metal hydroxide which includes nickel (Ni) and cobalt (Co) and includes at least one of manganese (Mn) and aluminum (Al), wherein the nickel (Ni) is 60 mol % or greater in all metals, with a lithium compound and subjecting the mixture to primary firing to prepare a lithium composite transition metal oxide particle, and mixing the lithium composite transition metal oxide particle and a doping source including a doping element and subjecting the mixture to secondary firing to dope the doping element on the lithium composite transition metal oxide particle.

The above-described positive electrode active material for a secondary battery may be prepared by the above method, and more specifically, it is possible to prepare a positive electrode active material having a particle strength of 210 MPa to 290 MPa.

Also, according to the preparation method of the present disclosure, a lithium composite transition metal oxide is not prepared by firing a transition metal hydroxide, a lithium compound, and a doping source all at once. Instead, a primary fired material (a lithium composite transition metal oxide) is prepared first by subjecting a transition metal hydroxide and a lithium compound to primary firing, and then the primary fired material and a doping source are subjected to secondary firing to prepare a positive electrode active material for a secondary battery. Accordingly, a doping element by the doping source may be doped such that the content of the doping element decreases from the surface of a particle toward the center thereof. Accordingly, the particle strength of the positive electrode active material may be further improved, so that effects of improving the durability of the particle during roll-pressing or in a charge/discharge process and preventing cracks may be more preferably implemented. In addition, since the doping element may improve the structural stability of a particle by the above method, it is possible to effectively prevent structural collapse due to the intercalation/de-intercalation of lithium and lifespan properties deterioration.

The method for preparing a positive electrode active material for a secondary battery of the present disclosure includes a step of mixing a transition metal hydroxide which includes nickel (Ni) and cobalt (Co) and includes at least one of manganese (Mn) and aluminum (Al) with a lithium compound and subjecting the mixture to primary firing to prepare a lithium composite transition metal oxide particle.

The transition metal hydroxide is a component which is a precursor of a positive electrode active material for a secondary battery, and includes nickel (Ni) and cobalt (Co) and includes at least one of manganese (Mn) and aluminum (Al).

The transition metal hydroxide may be a high-Ni transition metal hydroxide in which the content of nickel (Ni) in all metals contained in the transition metal hydroxide is 60 mol % or greater. More preferably, the content of nickel (Ni) in all metals may be 61 mol % or greater. When the content of nickel (Ni) in all metals is controlled to be in the range described above, it is possible to secure a high capacity of a positive electrode active material prepared.

The transition metal hydroxide may be a compound represented by Formula 2 below.

In Formula 2, 0<x1≤0.2, 0<y1≤0.2, and 0<x1+y1≤0.4, and $M^{a1}$ is at least one selected from the group consisting of Mn and Al.

In Formula 2 above, x1 and y1 may be the same as x and y described in Formula 1 above, respectively.

The lithium compound is also a precursor of a positive electrode active material for a secondary battery together with the transition metal hydroxide.

The lithium compound may be a carbonate (for example, $Li_2CO_3$ and the like), a hydrate (for example, lithium hydroxide hydrate ($LiOH \cdot H_2O$) and the like), a hydroxide (for example, lithium hydroxide and the like), a nitrate (for example, lithium nitrate ($LiNO_3$) and the like) and a chloride (for example, lithium chloride (LiCl) and the like), and the like, all containing lithium, and any one thereof or a mixture of two or more thereof may be used.

The primary firing may be performed at 750° C. to 1,000° C., preferably 800° C. to 900° C., and it is preferable that the above range is satisfied since a positive electrode active material of a layered structure which is structurally stable may be formed.

The primary firing may be performed for 10-25 hours, preferably 13-18 hours, and it is preferable that the above range is satisfied since a positive electrode active material of a layered structure which is structurally stable may be formed.

The primary firing may be performed in an oxygen atmosphere in terms of preventing an excessive generation of lithium impurities and generating a primary fired material having excellent grain development.

The method for preparing a positive electrode active material for a secondary battery of the present disclosure includes a step of mixing the lithium composite transition metal oxide particle and the doping source including the doping element and subjecting the mixture to secondary firing to dope the doping element on the lithium composite transition metal oxide particle.

Through the secondary firing of the lithium composite transition metal oxide particle and the doping source, the positive electrode active material for a secondary battery of the present disclosure may be prepared.

The doping source is a material for supplying a doping element to be doped on a positive electrode active material, and includes the doping element.

The doping source may include at least one doping element selected from the group consisting of P, B, Al, Si, W, Zr, and Ti, preferably at least one doping element selected from the group consisting of B, W, Zr, and Ti, more preferably at least one doping element selected from the group consisting of W and Zr, and even more preferably a doping element of W. Specifically, the doping source may include oxides of the doping elements described above.

The input amount of the doping source may be adequately controlled in consideration of the content (mol %) of a doping element in a positive electrode active material.

The secondary firing may be performed at 700° C. to 900° C., preferably 750° C. to 880° C., and it is preferable that the above range is satisfied since the distribution of a doping element in a positive electrode active material may be more concentrated on the surface of a particle rather than on the center of the particle, so that the intensity range of the particle described above may be achieved.

The secondary firing may be performed for 3-12 hours, preferably 5-8 hours, and it is preferable that the above range is satisfied since the distribution of a doping element in a positive electrode active material may be more concentrated on the surface of a particle rather than on the center of the particle, so that the intensity range of the particle described above may be achieved.

The secondary firing may be performed in an oxygen atmosphere in terms of smoothly performing doping.

<Positive Electrode for Secondary Battery and Secondary Battery>

In addition, the present disclosure provides a positive electrode for a secondary battery, the positive electrode including the positive electrode active material for a secondary battery.

Specifically, the positive electrode for a secondary battery includes a positive electrode current collector and a positive electrode active material layer formed on the positive electrode current collector and including the positive electrode active material for a secondary battery.

The positive electrode current collector is not particularly limited as long as it has a conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3-500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

The positive electrode active material layer may include a conductive material and a binder, together with the positive electrode active material for a secondary battery described above.

The conductive material is used to impart conductivity to an electrode, and any conductive material may be used without particular limitation as long as it has electron conductivity without causing a chemical change in a battery to be constituted. Specific examples thereof may include graphite such as natural graphite and artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whiskey such as potassium titanate; a conductive metal oxide such as titanium oxide; or a conductive polymer such as a polyphenylene derivative, and any one thereof or a mixture of two or more thereof may be used. Typically, the conductive material may be included in an amount of 1-30 wt % based on the total weight of a positive electrode active material layer.

The binder serves to improve the bonding between positive electrode active material particles and the adhesion between a positive electrode active material and a positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1-30 wt % based on the total weight of the positive electrode active material layer.

The positive electrode for a secondary battery may be manufactured according to a typical method for manufacturing a positive electrode except that the positive electrode active material described above is used. Specifically, the positive electrode may be manufactured by applying a composition for forming a positive electrode active material layer including the positive electrode active material described above and optionally, a binder and a conductive material on the positive electrode current collector, followed by drying and roll-pressing. At this time, the type and content of the positive electrode active material, the binder, and the conductive material are as described above.

The solvent may be a solvent commonly used in the art, and may be dimethyl sulfoxide (DMSO), isopropyl alcohol, N-methylpyrrolidone (NMP), acetone, water, or the like. Any one thereof or a mixture of two or more thereof may be used. The amount of the solvent to be used is sufficient if the solvent may dissolve and disperse the positive electrode active material, the binder, and the conductive material in consideration of the applying thickness of a slurry and preparation yield, and thereafter, have a viscosity which may exhibit excellent thickness uniformity during application for manufacturing a positive electrode.

In addition, in another method, the positive electrode for a secondary battery may be manufactured by casting the composition for forming a positive electrode active material layer on a separate support and then laminating a film obtained by being peeled off from the support on the positive electrode current collector.

In addition, the present disclosure provides an electrochemical device including the positive electrode for a secondary battery. The electrochemical device may be specifically a secondary battery, a capacitor, or the like, and more specifically, may be a lithium secondary battery.

The secondary battery specifically includes the above-described positive electrode for a secondary battery, a negative electrode facing the positive electrode for a secondary battery, a separator interposed between the positive electrode for a secondary battery and the negative electrode, and an electrolyte. Also, the secondary battery may selectively further include a battery case for accommodating an electrode assembly composed of the positive electrode, the negative electrode, and the separator, and a sealing member for sealing the battery case.

In the secondary battery, the negative electrode includes a negative electrode current collector and a negative electrode active material layer positioned on the negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3-500 µm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, a non-woven body, and the like.

The negative electrode active material layer selectively includes a binder and a conductive material in addition to a negative electrode active material. As an example, the negative electrode active material layer may be prepared by applying a composition for forming a negative electrode including a negative electrode active material and selectively a binder and a conductive material on a negative electrode current collector, following by drying. Alternatively, the negative electrode active material layer may be prepared by casting the composition on a separate support, and then laminating a film obtained by being peeling off from the support on a negative electrode current collector.

As the negative electrode active material, a compound capable of reversible intercalation and de-intercalation of lithium may be used. Specific examples of the negative electrode active material may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO_\beta$ ($0<\beta<2$), $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

Also, the binder and the conductive material may be the same as those described above in the description of the positive electrode.

Meanwhile, in the secondary battery, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Furthermore, a coated separator including a ceramic component or a polymer material may be used to secure heat resistance or mechanical strength, and may be used in a single-layered or a multi-layered structure, selectively.

In addition, the electrolyte used in the present disclosure may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and s-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among the above solvents, a carbonate-based solvent is preferable, and a mixture of a cyclic carbonate (e.g., ethylene carbonate or propylene carbonate) having high ionic conductivity and high dielectric constant, which may increase charging/discharging performance of the battery, and a low-viscosity linear carbonate-based compound (e.g., ethylmethyl carbonate, dimethyl carbonate, or diethyl carbonate) is more preferable. In this case, the performance of the electrolyte may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1-2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included. At this time, the additive may be included in an amount of 0.1-5 wt % based on the total weight of the electrolyte.

As describe above, a secondary battery including the positive electrode active material for a secondary battery according to the present disclosure stably exhibits excellent discharging capacity, output properties, and capacity retention rate, and thus, is useful for portable devices such as a mobile phone, a notebook computer, and a digital camera, and in the field of electric cars such as a hybrid electric vehicle (HEV).

Accordingly, the present disclosure provides a battery module including the secondary battery as a unit cell, and a battery pack including the same.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), and a system for storing power.

Examples for Carrying Out the Present Disclosure

Hereinafter, Examples of the present disclosure will be described in detail so that those skilled in the art may easily carry out the present disclosure. However, the present disclosure may be embodied in many different forms, and is not limited to Examples set forth herein.

EXAMPLES

Example 1: Preparation of Positive Electrode Active Material for Secondary Battery A transition metal hydroxide $Ni_{0.7}Co_{0.1}Mn_{0.2}(OH)_2$ and a lithium hydroxide LiOH were mixed. At this time, the transition metal hydroxide and the lithium hydroxide were mixed such that a ratio Li/Me of the number moles of lithium (Li) to the total number of moles of transition metals of the transition metal hydroxide was controlled to be 1.03.

The mixture was subjected to primary firing in an oxygen atmosphere for 15 hours at 850° C., and a primary fired material $Li_{1.03}Ni_{0.7}Co_{0.1}Mn_{0.2}O_2$ was prepared.

The lithium composite transition metal oxide and a doping source $WO_3$ were mixed. At this time, the lithium composite transition metal oxide and the doping source were mixed such that a doping element W included in the doping source was doped to 7 mol % with respect to all metals excluding lithium in a positive electrode active material prepared. The mixture was subjected to secondary firing in an oxygen atmosphere for 7 hours at 800° C., and a positive electrode active material $Li_{1.03}Ni_{0.63}Co_{0.1}Mn_{0.2}W_{0.07}O_2$ (average particle diameter ($D_{50}$) of 11 μm) in which the doping element W is doped on the lithium composite transition metal oxide was prepared.

Example 2: Preparation of Positive Electrode Active Material for Secondary Battery A positive electrode active material $Li_{1.03}Ni_{0.61}Co_{0.1}Mn_{0.2}W_{0.09}O_2$ (average particle diameter ($D_{50}$) of 11 μm) for a secondary battery of Example 2 was prepared in the same manner as in Example 1 except that the lithium composite transition metal oxide and the doping source were mixed such that the doping element W included in the doping source was doped to 9 mol % with respect to all metals excluding lithium in a positive electrode active material.

Example 3: Preparation of Positive Electrode Active Material for Secondary Battery A positive electrode active material $Li_{1.03}Ni_{0.63}Co_{0.1}Mn_{0.2}Zr_{0.07}O_2$ (average particle diameter ($D_{50}$) of 11 μm) for a secondary battery of Example 3 was prepared in the same manner as in Example 1 except that $ZrO_2$ was used as a doping source.

Example 4: Preparation of Positive Electrode Active Material for Secondary Battery A positive electrode active material $Li_{1.03}Ni_{0.6}Co_{0.1}Mn_{0.2}W_{0.1}O_2$ (average particle diameter ($D_{50}$) of 11 μm) for a secondary battery of Example 4 was prepared in the same manner as in Example 1 except that the lithium composite transition metal oxide and the doping source were mixed such that the doping element W included in the doping source was doped to 10 mol % with respect to all metals excluding lithium in a positive electrode active material.

Comparative Example 1: Preparation of Positive Electrode Active Material for Secondary Battery The primary fired material $Li_{1.03}Ni_{0.7}Co_{0.1}Mn_{0.2}O_2$ (average particle diameter ($D_{50}$) of 11 μm) prepared in Example 1 was used as a positive electrode active material (average particle diameter ($D_{50}$) of 11 μm) for a secondary battery of Comparative Example 1.

Comparative Example 2: Preparation of Positive Electrode Active Material for Secondary Battery A positive electrode active material $Li_{1.03}Ni_{0.69}Co_{0.1}Mn_{0.2}Zr_{0.01}O_2$ (average particle diameter ($D_{50}$) of 11 μm) for a secondary battery of Comparative Example 2 was prepared in the same manner as in Example 1 except that $ZrO_2$ was used as a doping source and the lithium composite transition metal oxide and the doping source were mixed such that a doping element Zr was doped to 1 mol % with respect to all metals excluding lithium in a positive electrode active material.

Comparative Example 3: Preparation of Positive Electrode Active Material for Secondary Battery A positive electrode active material $Li_{1.03}Ni_{0.09}Co_{0.1}Mn_{0.2}W_{0.01}O_2$ (average particle diameter ($D_{50}$) of 11 μm) for a secondary battery of Comparative Example 3 was prepared in the same manner as in Example 1 except that $WO_3$ was used as a doping source and the lithium composite transition metal oxide and the doping source were mixed such that a doping element W included in the doping source was doped to 1 mol % with respect to all metals excluding lithium in a positive electrode active material.

Comparative Example 4: Preparation of Positive Electrode Active Material for Secondary Battery A transition metal hydroxide $Ni_{0.7}Co_{0.1}Mn_{0.2}(OH)_2$, a lithium hydroxide LiOH, and a doping source $WO_3$ were mixed.

At this time, the transition metal hydroxide and the lithium hydroxide were mixed such that a ratio Li/Me of the number moles of lithium (Li) to the total number of moles of transition metals of the transition metal hydroxide was controlled to be 1.03. The lithium composite transition metal oxide and the doping source were mixed such that a doping element W included in the doping source was doped to 7 mol % with respect to all metals excluding lithium in a positive electrode active material.

The mixture was fired in an oxygen atmosphere for 15 hours at 850° C., and $Li_{1.03}Ni_{0.03}Co_{0.1}Mn_{0.2}W_{0.07}O_2$ (average particle diameter ($D_{50}$) of 11 μm) having an average particle diameter ($D_{50}$) of 11 μm was prepared as a positive electrode active material in which the doping element W is doped in the lithium composite transition metal oxide.

Comparative Example 5: Preparation of Positive Electrode Active Material for Secondary Battery A positive electrode active material $Li_{1.03}Ni_{0.05}Co_{0.1}Mn_{0.2}W_{0.05}O_2$ (average particle diameter ($D_{50}$) of 11 μm) for a secondary battery of Comparative Example 5 was prepared in the same manner as in Example 1 except that $WO_3$ was used as a doping source and the lithium composite transition metal oxide and the doping source were mixed such that a doping element W was doped to 5 mol % with respect to all metals excluding lithium in a positive electrode active material.

Comparative Example 6: Preparation of Positive Electrode Active Material for Secondary Battery A transition metal hydroxide $Ni_{0.7}Co_{0.1}Mn_{0.2}(OH)_2$ and a lithium hydroxide LiOH were mixed. At this time, the transition metal hydroxide and the lithium hydroxide were mixed such that a ratio Li/Me of the number moles of lithium (Li) to the total number of moles of transition metals of the transition metal hydroxide was controlled to be 1.03.

The mixture was subjected to primary firing in an oxygen atmosphere for 20 hours at 950° C., and a primary fired material $Li_{1.03}Ni_{0.7}Co_{0.1}Mn_{0.2}O_2$ was prepared.

The lithium composite transition metal oxide and a doping source $WO_3$ were mixed. At this time, the lithium composite transition metal oxide and the doping source were mixed such that a doping element W included in the doping source was doped to 20 mol % with respect to all metals excluding lithium in a positive electrode active material prepared. The mixture was subjected to secondary firing in an oxygen atmosphere for 10 hours at 900° C., and a positive electrode active material $Li_{1.03}Ni_{0.5}Co_{0.1}Mn_{0.2}W_{0.2}O_2$ (average particle diameter ($D_{50}$) of 11 μm) in which the doping element W is doped on the lithium composite transition metal oxide was prepared.

EXPERIMENTAL EXAMPLES

Experimental Example 1: Measurement of Particle Strength

The particle strength of the positive electrode active material of each of Examples 1 to 4 and Comparative Examples 1 to 6 was measured and is shown in Table 1 below.

<Measurement of Particle Strength>

The particle strength of the positive electrode active material of Example 1 was measured by dropping the particle of the positive electrode active material of Example 1 onto a plate through a micro compression testing machine (Device Name: MCT-W500, manufactured by Shimadzu Co., Ltd.), and then gradually applying pressure through the testing machine to a point at which the particle breaks, followed by quantifying the force of the point.

Also, the particle strength of the positive electrode active material of each of Examples 2 to 4 and Comparative Examples 1 to 6 was measured in the same manner as described above.

A total of 10 experiments were repeated for each of Examples and Comparative Examples to obtain the average values of Examples and Comparative Examples, and the values are shown in Table 1 below.

TABLE 1

|  | Examples |  |  |  | Comparative Examples |  |  |  |  |  |
| --- | --- | --- | --- | --- | --- | --- | --- | --- | --- | --- |
|  | 1 | 2 | 3 | 4 | 1 | 2 | 3 | 4 | 5 | 6 |
| Particle intensity (MPa) | 226.2 | 237.3 | 218.5 | 253.4 | 114.7 | 171.7 | 182.2 | 190.1 | 183.2 | 298.2 |

Experimental Example 2: Evaluation of High-Temperature Lifespan Properties

The high-temperature lifespan properties of the positive electrode active material of each of Examples 1 to 4 and Comparative Examples 1 to 6 were evaluated and are shown in FIG. 1 and Table 2.

<Manufacturing of Lithium Secondary Battery>

The positive electrode active material of Example 1, a carbon black conductive material, and a PVdF binder were mixed in an N-methylpyrrolidone solvent at a weight ratio of 96.5:1.5:2 to prepare a positive electrode slurry, and the positive electrode slurry was applied on one surface of an aluminum current collector, dried at 130° C., and then roll-pressed to a porosity of 25% to manufacture a positive electrode for a secondary battery.

Next, a mixture as a negative electrode active material in which artificial graphite and natural graphite are mixed at 5:5, superC as a conductive material, and SBR/CMC as a binder were mixed at a weight ratio of 96:1:3 to prepare a negative electrode slurry, and the negative electrode slurry was applied on one surface of a copper current collector, dried at 130° C., and then roll-pressed to a porosity of 30% to manufacture a negative electrode.

A porous polyethylene separator was interposed between the positive electrode for a secondary battery and the negative electrode which were manufactured as described above to prepare an electrode assembly, and then the electrode assembly was placed inside a case. Thereafter, an electrolyte was injected into the case to manufacture a lithium secondary battery of Example 1. At this time, the electrolyte was prepared by dissolving lithium hexafluorophosphate (LiPF6) to a 1.0 M concentration in an organic solvent in which ethylene carbonate (EC), dimethyl carbonate (DMC), and ethylmethyl carbonate (EMC) are mixed at a volume ratio of 3:4:3.

Also, a lithium secondary battery of each of Examples 2 to 4 and Comparative Examples 1 to 6 was manufactured in the same manner as in Example 1 except that the positive electrode active material for a secondary battery of each of Examples 2 to 4 and Comparative Examples 1 to 6 was used instead of using the positive electrode active material for a secondary battery of Example 1.

<Method for Evaluating High-Temperature Lifespan Properties>

The lithium secondary batteries of Examples and Comparative Examples manufactured as described above were charged/discharged under the condition of 1 C/1 C within the driving voltage range of 3.0 V to 4.25 V at a high temperature (45° C.)

For each of Examples and Comparative Examples, the capacity retention rate, which is a ratio of a discharge capacity according to each charge/discharge cycle to an initial capacity, was measured and is shown in FIG. 1, and the capacity retention rate of 400 cycles, which a ratio of a discharge capacity at the 400th cycle to an initial capacity after performing the charge/discharge for 400 times, was measured and is shown in Table 2.

TABLE 2

|  | Capacity retention rate (%) of 400 cycles at 45° C. |
| --- | --- |
| Example 1 | 87.7 |
| Example 2 | 90.4 |
| Example 3 | 86.2 |
| Example 4 | 85.3 |
| Comparative Example 1 | 64.2 |
| Comparative Example 2 | 75.9 |
| Comparative Example 3 | 80.2 |
| Comparative Example 4 | 83.9 |
| Comparative Example 5 | 82.4 |
| Comparative Example 6 | 73.8 |

Referring to FIG. 1 and Table 2, it can be confirmed that the lithium secondary batteries manufactured using each of the positive electrode active materials of Examples which satisfies the particle strength of the present disclosure exhibit an excellent capacity retention rate at a high temperature when compared with those of Comparative Examples, and thus, has excellent high-temperature lifespan properties.

Experimental Example 3: Observation of Particle Breakage

The breakage of a positive electrode active material particle after performing charge/discharge 400 times at a high temperature (45° C.) under the condition of Experimental Example 2 was observed through a scanning electron microscope (SEM).

The SEM photographs of Examples 1 to 4 are respectively shown in FIG. 2 to FIG. 5, and the SEM photographs of Comparative Examples 1 to 6 are respectively shown in FIG. 6 to FIG. 11.

Referring to FIG. 2 to FIG. 11, the positive electrode active material of each of Examples satisfying the particle strength of the present disclosure hardly had particle breakage. However, Comparative Examples had a lot of particle breakage after a charge/discharge cycle was performed. Accordingly, structural stability and durability were poor, and accordingly, it can be confirmed that lifespan properties would be poor.

Experimental Example 4: EDS Observation

The distribution and content of a doping element of each of Example 1 and Comparative Example 4 were analyzed through an Energy Dispersive Spectrometer (EDS) (Device name: FE-SEM, manufactured by Bruker Co., Ltd.).

As the EDS analysis, the shape of a particle cross-section of each of Example 1 and Comparative Example 4 was analyzed with an SEM, and using an EMAX program, the content of a doping element of a specific region of the particle was quantitatively analyzed.

Figure 12:
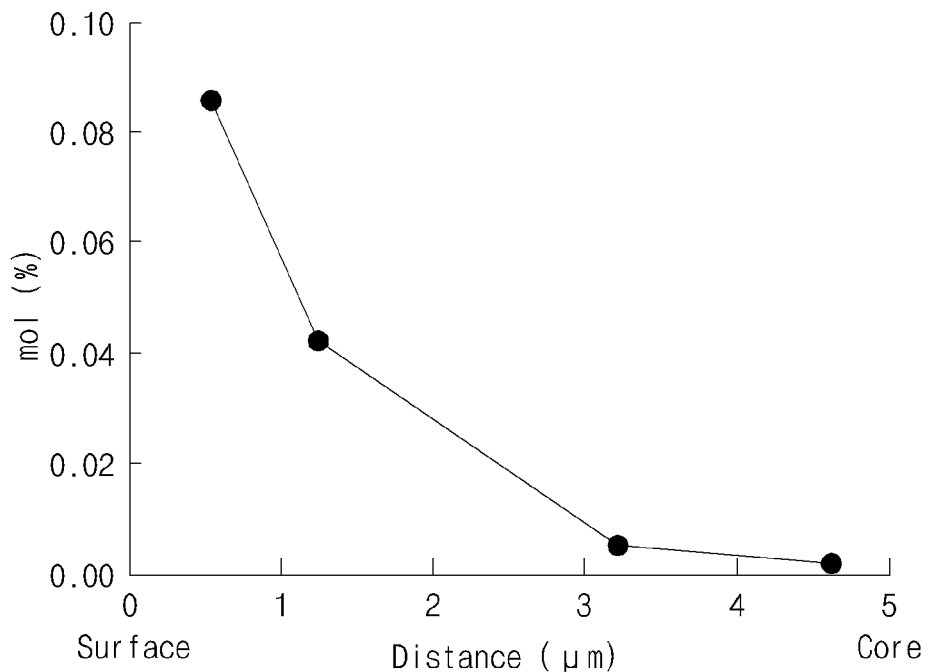
FIG. 12 is a graph showing an analysis of the distribution and content of a doping element according to a position in the positive electrode active material for a secondary battery of Example 1, the analysis obtained through an Energy Dispersive Spectrometer (EDS)
Figure 13:
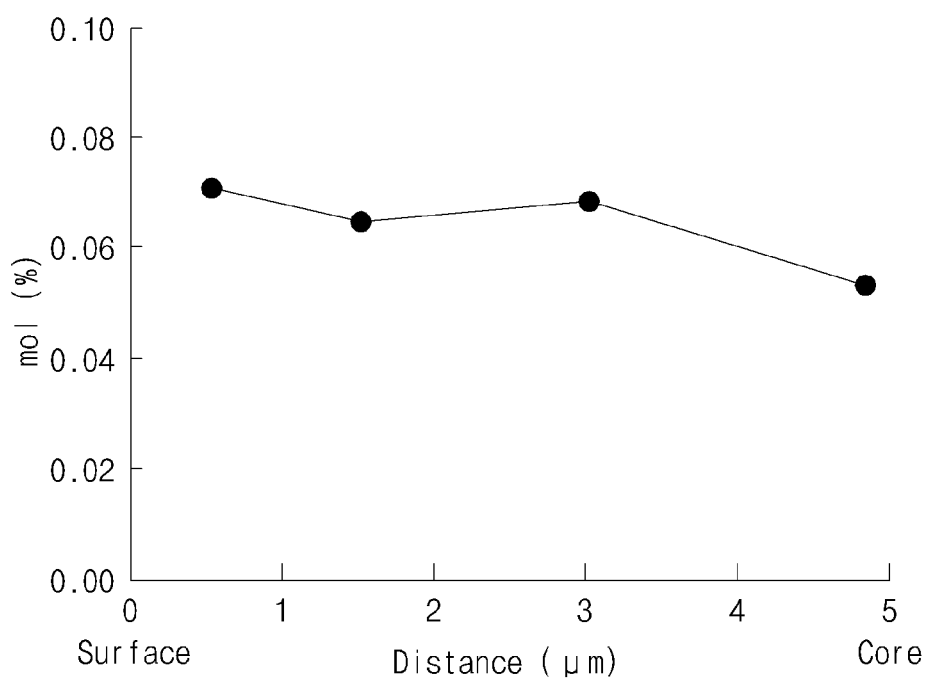
FIG. 13 is a graph showing an analysis of the distribution and content of a doping element according to a position in the positive electrode active material for a secondary battery of Comparative Example 4, the analysis obtained through an EDS.

The content of the doping element W from the surface of each of Example 1 and Comparative Example 4 to the center thereof is shown in FIG. 12 and FIG. 13, respectively. According to FIG. 12 and FIG. 13, in a region corresponding to a distance of 60% to 100% from the center of the particle with respect to the half diameter of the lithium composite transition metal oxide particle, the doping amount of the corresponding region to the total doping amount was about 99 wt % for Example 1 and about 40 wt % for Comparative Example 4.

In addition, when the cross-section of a particle of the positive electrode active material of Example 1 was analyzed by the EDS, a value obtained by substituting the concentration of the doping element at the particle surface and at the particle center into Equation 1 below was 1. In addition, when the cross-section of a particle of the positive electrode active material of Comparative Example 4 was analyzed by the EDS, a value obtained by substituting the concentration of the doping element at the particle surface and at the particle center into Equation 1 below was 0.25.

$(H_s-H_c)/H_s$ [Equation 1]

(In Equation 1, $H_s$ is the concentration of the doping element at the surface of the particle when the lithium composite transition metal oxide particle is analyzed by EDS, and $H_c$ is the concentration of the doping element at the center of the particle when the lithium composite transition metal oxide particle is analyzed by EDS).

When reviewing the above results, the positive electrode active material of Example 1 was formed to have a plurality of the doping elements distributed on the surface thereof, thereby having high particle strength, and as shown in Experimental Examples 2 and 3, effects of excellent durability, particle breakage prevention, and lifespan properties improvement were implemented.

However, the positive electrode active material of Comparative Example 4 had the doping elements evenly distributed over the active material particle, so that it was difficult to satisfy the required particle strength, and effects in terms of durability and lifespan properties were poor.

The invention claimed is:

1. A positive electrode active material for a secondary battery, the positive electrode active material being a lithium composite transition metal oxide particle including nickel (Ni) and cobalt (Co) and including at least one of manganese (Mn) and aluminum (Al), wherein
the lithium composite transition metal oxide particle includes 60 mol % or greater of the nickel (Ni) in all metals excluding lithium,
a doping element is doped on the lithium composite transition metal oxide particle to 70 mol % or greater of the total number of moles of doping elements in a region corresponding to a distance of 60% to 100% from the center of the lithium composite transition metal oxide particle with respect to the half diameter of the lithium composite transition metal oxide particle, and
the particle strength of the lithium composite transition metal oxide particle is 210 MPa to 290 MPa.

2. The positive electrode active material of claim 1, wherein the doping element is doped to 6 mol % to 10 mol % with respect to all metals excluding lithium.

3. The positive electrode active material of claim 1, wherein the doping element comprises at least one selected from the group consisting of P, B, Al, Si, W, Zr, and Ti.

4. The positive electrode active material of claim 1, wherein the lithium composite transition oxide particle comprises a compound represented by Formula 1 below:

$Li_pNi_{1-x-y-z}CO_xM^a_yM^b_zO_2$ [Formula 1]

wherein in Formula 1, 1.0≤p≤1.5, 0<x≤0.2, 0<y≤0.2, 0.06≤z≤0.1, and 0<x+y+z≤0.4,
$M^a$ is at least one selected from the group consisting of Mn and Al, and
$M^b$ is at least one selected from the group consisting of P, B, Al, Si, W, Zr, and Ti.

5. The positive electrode active material of claim 1, wherein the average particle diameter ($D_{50}$) is 8 μm to 30 μm.

6. The positive electrode active material of claim 1, wherein the lithium composite transition metal oxide particle has a value of 0.7 to 1, the value obtained by substituting the concentration of the doping element at the surface of the particle and the concentration of the doping element at the center of the particle analyzed by an Energy Dispersive Spectrometer (EDS) into Equation 1 below:

$(H_s-H_c)/H_s$ [Equation 1]

wherein in Equation 1, $H_s$ is the concentration of the doping element at the surface of the particle when the lithium composite transition metal oxide particle is analyzed by an EDS, and $H_c$ is the concentration of the doping element at the center of the particle when the lithium composite transition metal oxide particle is analyzed by an EDS.

7. A method for preparing a positive electrode active material for a secondary battery according to claim 1, the method comprising:
mixing a transition metal hydroxide which includes nickel (Ni) and cobalt (Co) and includes at least one of manganese (Mn) and aluminum (Al), wherein the nickel (Ni) is 60 mol % or greater in all metals, with a lithium compound and subjecting the mixture to primary firing to prepare a lithium composite transition metal oxide particle; and
mixing the lithium composite transition metal oxide particle and a doping source including a doping element and subjecting the mixture to secondary firing to dope the doping element on the lithium composite transition metal oxide particle.

8. The method of claim 7, wherein the doping source comprises at least one doping element selected from the group consisting of P, B, Al, Si, W, Zr, and Ti.

9. The method of claim 7, wherein the primary firing is performed for 10-25 hours.

10. The method of claim 7, wherein the primary firing is performed at 750-1,000° C.

11. The method of claim 7, wherein the secondary firing is performed for 3-12 hours.

12. The method of claim 7, wherein the secondary firing is performed at 700-900° C.

13. A positive electrode for a secondary battery, the positive electrode comprising:
 a positive electrode current collector; and
 a positive electrode active material layer formed on the positive electrode current collector, wherein the positive electrode active material layer includes the positive electrode active material for a secondary battery according to claim 1.

\* \* \* \* \*